(12) United States Patent
Cheng

(10) Patent No.: US 12,540,696 B2
(45) Date of Patent: Feb. 3, 2026

(54) HOSE ASSEMBLY

(71) Applicant: YUAN MEI CORP., Changhua County (TW)

(72) Inventor: Chi-Han Cheng, Changhua County (TW)

(73) Assignee: YUAN MEI CORP., Changhua County (TW)

( * ) Notice: Subject to any disclaimer, the term of this patent is extended or adjusted under 35 U.S.C. 154(b) by 0 days.

(21) Appl. No.: 18/666,015

(22) Filed: May 16, 2024

(65) Prior Publication Data

US 2025/0354633 A1  Nov. 20, 2025

(51) Int. Cl.
*F16L 33/207* (2006.01)
*F16L 33/24* (2006.01)
*F16L 33/26* (2006.01)

(52) U.S. Cl.
CPC .......... *F16L 33/2071* (2013.01); *F16L 33/207* (2013.01); *F16L 33/2073* (2013.01); *F16L 33/2076* (2013.01); *F16L 33/24* (2013.01); *F16L 33/26* (2013.01)

(58) Field of Classification Search
CPC ....... F16L 33/223; F16L 33/20; F16L 33/207; F16L 33/2071; F16L 33/2073; F16L 33/2076; F16L 33/24; F16L 33/26; F16L 33/224
See application file for complete search history.

(56) References Cited

U.S. PATENT DOCUMENTS

| | | | | |
|---|---|---|---|---|
| 2,430,921 A * | 11/1947 | Edelmann | ............. | F16L 33/207 |
| 2,479,702 A * | 8/1949 | Rood | | |
| 2,570,477 A * | 10/1951 | Paquin | ................ | F16L 33/2076 |
| 2,782,060 A * | 2/1957 | Appleton | ................ | F16L 33/26 |
| 3,791,680 A * | 2/1974 | Cleare | ..................... | F16L 33/26 |
| 4,288,110 A * | 9/1981 | Grenell | .................... | F16L 33/24 |
| 4,412,693 A * | 11/1983 | Campanini | | |
| 4,850,620 A * | 7/1989 | Puls | | |
| 5,857,711 A | 1/1999 | Comin-Dumong | | |
| 6,308,993 B1 * | 10/2001 | Phillips | .............. | F16L 33/2071 |
| 7,108,292 B2 | 9/2006 | Lipscomb | | |
| 9,810,357 B2 | 11/2017 | Blanchette | | |
| 11,162,623 B2 * | 11/2021 | Allman | | |
| 2003/0038478 A1 * | 2/2003 | Humphreys | | |
| 2006/0208110 A1 | 9/2006 | Guo | | |
| 2006/0208482 A1 | 9/2006 | Guo | | |
| 2006/0208483 A1 | 9/2006 | Guo | | |
| 2013/0154257 A1 * | 6/2013 | Ault | .................... | F16L 33/2073 |
| 2016/0102795 A1 | 4/2016 | O'Connor | | |
| 2016/0312940 A1 | 10/2016 | Melo | | |
| 2018/0347737 A1 * | 12/2018 | Speidel | .............. | F16L 33/2076 |
| 2019/0242502 A1 * | 8/2019 | Pan | ........................ | F16L 33/223 |
| 2022/0107041 A1 * | 4/2022 | Cheng | ................... | F16L 33/224 |
| 2025/0092982 A1 * | 3/2025 | Guo | | |

\* cited by examiner

Primary Examiner — William S. Choi
(74) Attorney, Agent, or Firm — Maschoff Brennan

(57) ABSTRACT

A hose assembly (1) including a fluid passage (11), a male coupler (12) and a blocker (13). The fluid passage (11) has an outlet (1112*a*). The male coupler (12) is rotatably sleeved on the fluid passage (11) at the outlet (1112*a*). The blocker (13) is protruded from the fluid passage (11) at the outlet (1112*a*) to restrict detachment of the male coupler (12) from the outlet (1112*a*) of the fluid passage (11).

6 Claims, 5 Drawing Sheets

HOSE ASSEMBLY

TECHNICAL FIELD

The present disclosure relates to a hose assembly, more particularly to a hose assembly with a rotatable male coupler.

BACKGROUND

A hose assembly is typically used with one end connected to a fluid supply and the opposite end serving as an outlet for dispensing fluid.

However, in conventional hose assemblies where the outlet is designed with external threads, the outlets are generally designed fixed with respect to the main hose bodies. As a result, when connecting end fittings such as sprinklers to the non-rotatable outlets of the conventional hose assemblies, it is necessary to rotate a large-sized end fitting to prevent tangling or twisting of the main hose body of the conventional hose assembly.

SUMMARY

The present disclosure provides a hose assembly to address the assembly inconvenience caused by the non-rotatable outlet with external threads with respect to the main hose body.

According to one aspect of the present disclosure, a hose assembly including a fluid passage, a male coupler and a blocker. The fluid passage has an outlet. The male coupler is rotatably sleeved on the fluid passage at the outlet. The blocker is protruded from the fluid passage at the outlet to restrict detachment of the male coupler from the outlet of the fluid passage.

According to the hose assembly discussed above, since the male coupler can be rotated with respect to the fluid passage, the engagement between the male coupler and an end fitting can be easily accomplished simply by rotating the small-sized male coupler, and tangling and twisting of the fluid passage caused by rotation thereof can also be prevented.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
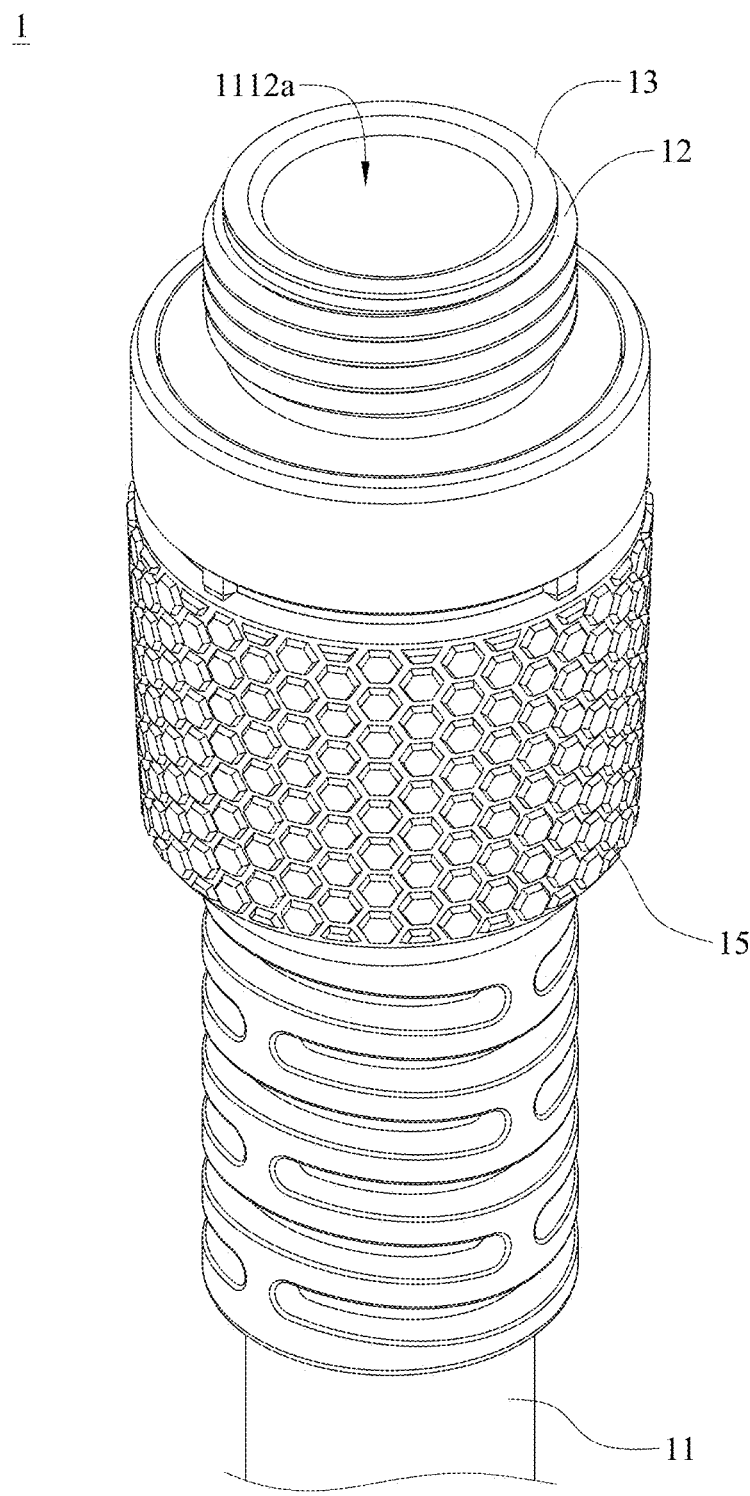
FIG. 1 is a perspective view of a hose assembly according to one embodiment of the present disclosure.
Figure 2:
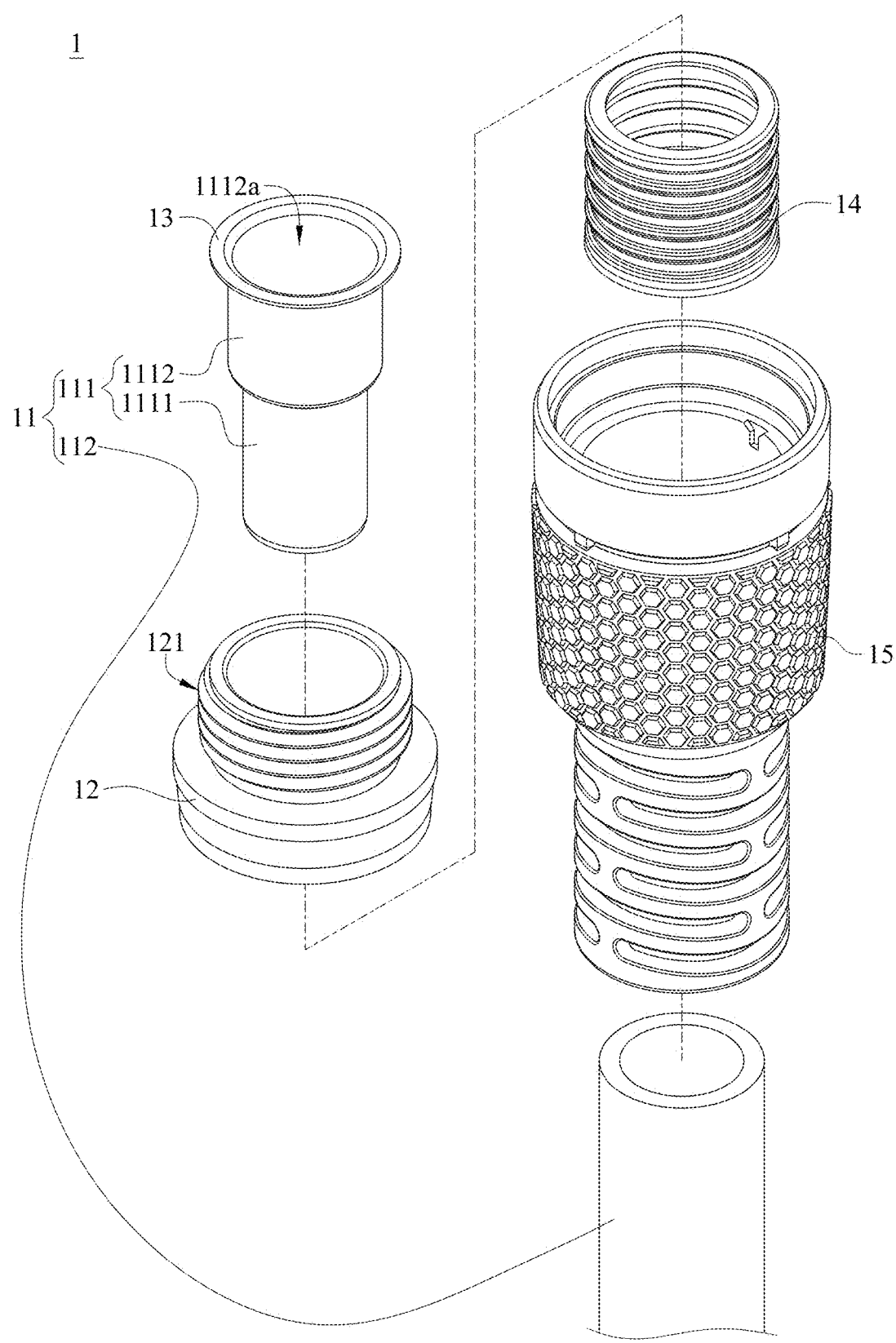
FIG. 2 is an exploded view of the hose assembly in FIG. 1.
Figure 3:
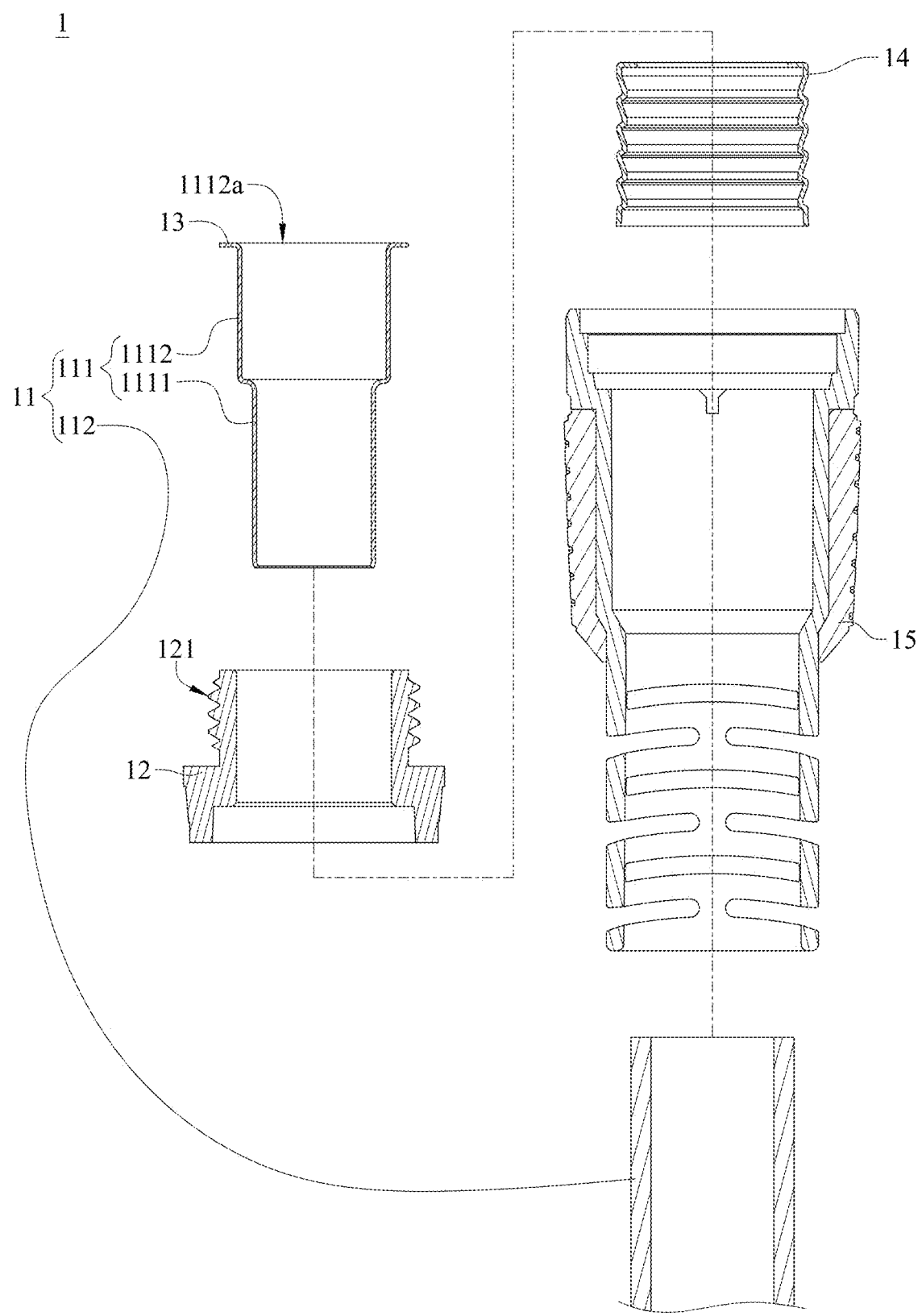
FIG. 3 is a cross-sectional view of the hose assembly in FIG. 2.

In the following, one embodiment of the present disclosure will be illustrated. Please refer to FIG. 1 to FIG. 3, where FIG. 1 is a perspective view of a hose assembly according to one embodiment of the present disclosure, FIG. 2 is an exploded view of the hose assembly in FIG. 1, and FIG. 3 is a cross-sectional view of the hose assembly in FIG. 2.

A hose assembly 1 provided in this embodiment is suitable for, for example, garden watering applications. The hose assembly 1 may include a fluid passage 11, a male coupler 12, a blocker 13, a ferrule 14 and a sleeve 15.

The fluid passage 11 may, for example, be configured for fluid such as water to flow therethrough. The fluid passage 11 may include a support part 111 and a tube part 112.

The support part 111 may be made of metal such as copper, but the present disclosure is not limited thereto. The support part 111 may include a first portion 1111 and a second portion 1112 that are connected to each other. The first portion 1111 may have a diameter different from (e.g., smaller than) that of the second portion 1112. The second portion 1112 may have an outlet 1112a at a side thereof away from the first portion 1111. Please be noted that in some other embodiments of the present disclosure, the diameter of the first portion may be larger than or equal to the diameter of the second portion.

Figure 4:
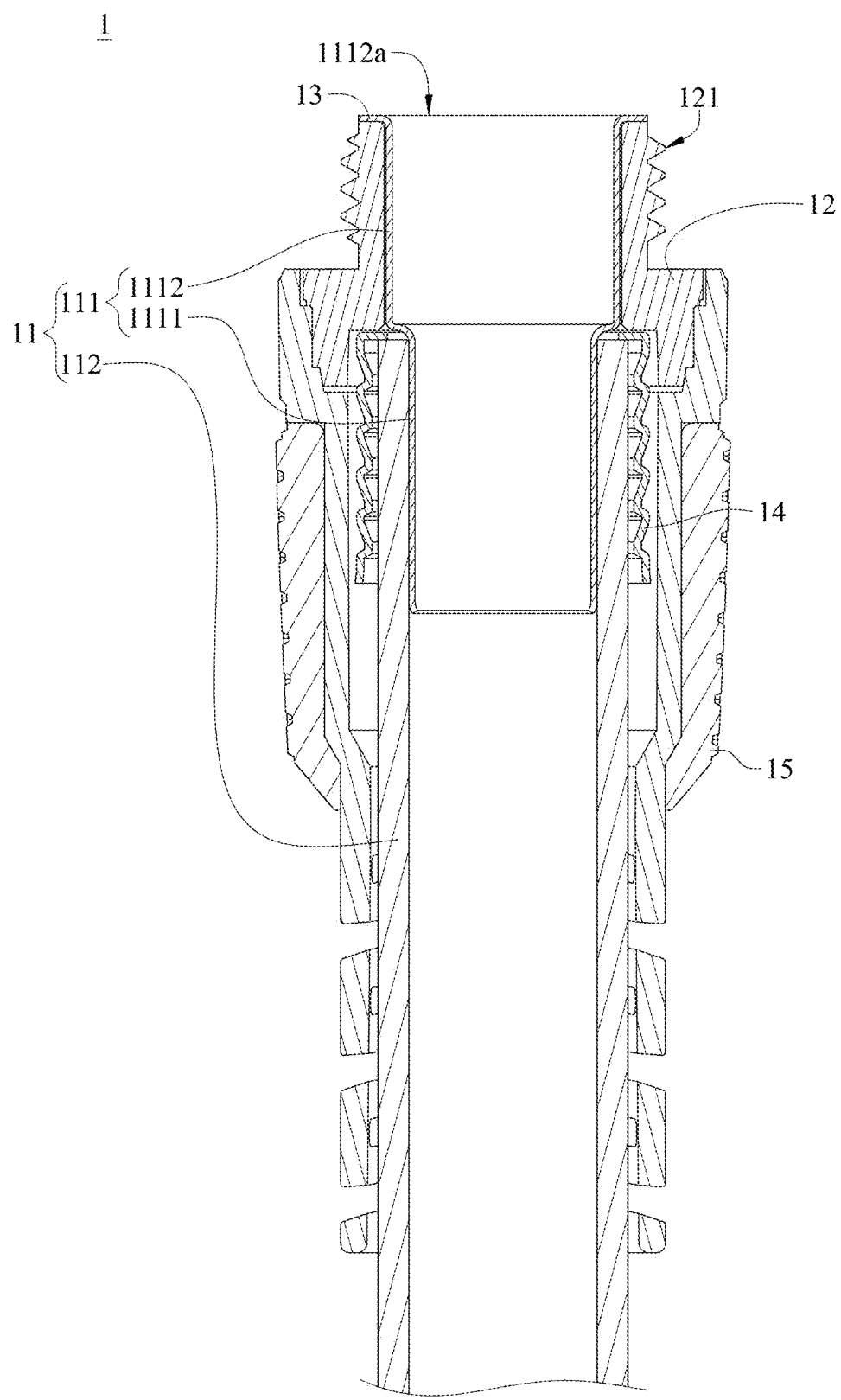
FIG. 4 is a cross-sectional view of the hose assembly in FIG. 1.
Figure 5:
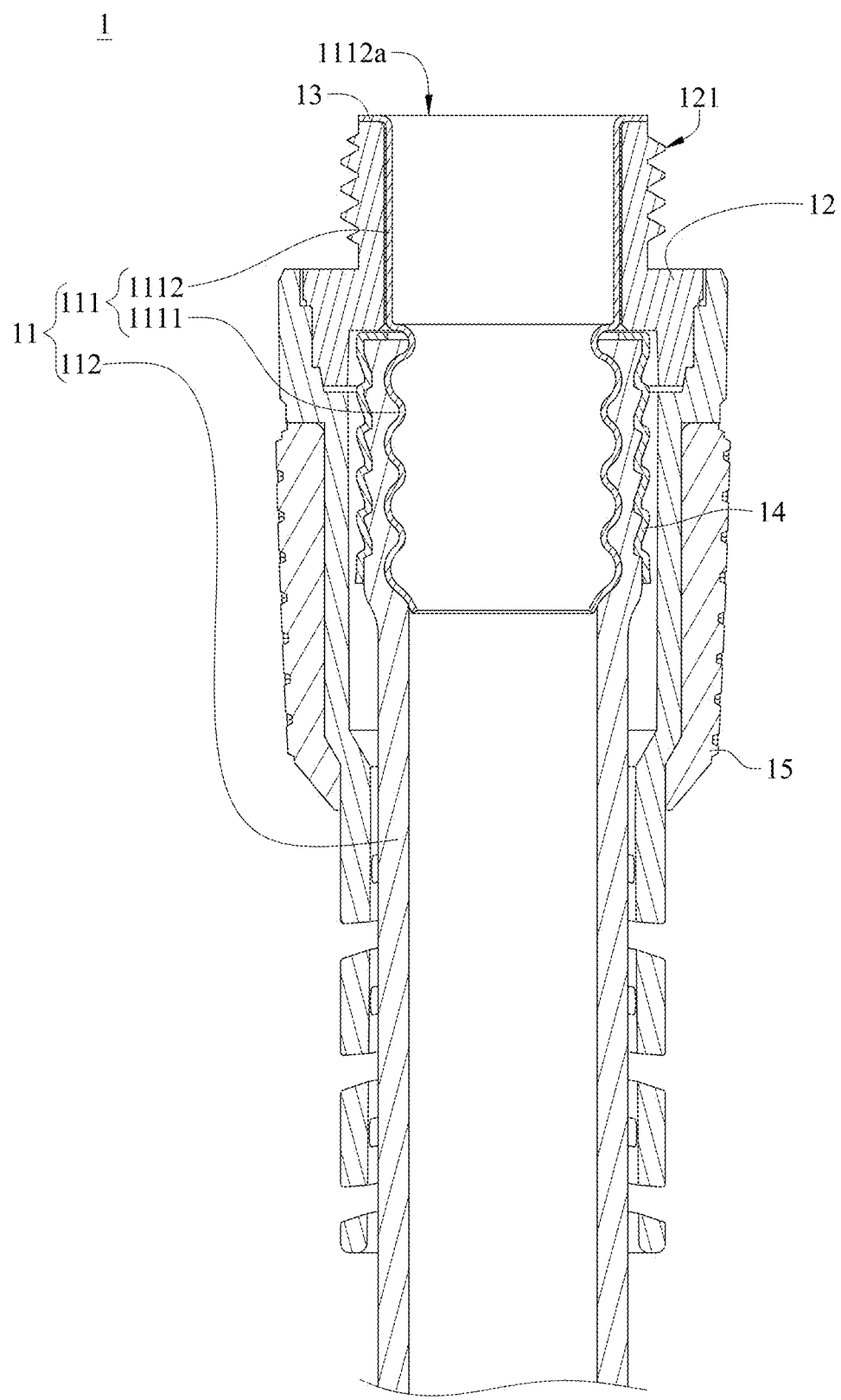
FIG. 5 is a cross-sectional view of the hose assembly in FIG. 1 in which a support part and a tube part are fixed to each other.

The tube part 112 may have one end in fluid communication connection with a fluid supply (not shown) and the other end fixedly sleeved on the first portion 1111. Specifically, please further refer to FIG. 4 and FIG. 5 together with FIG. 1 to FIG. 3, where FIG. 4 is a cross-sectional view of the hose assembly in FIG. 1, and FIG. 5 is a cross-sectional view of the hose assembly in FIG. 1 in which a support part and a tube part are fixed to each other. As shown in FIG. 4, the first portion 1111 of the support part 111 is simply placed inside the tube part 112 with rotational degrees of freedom of the support part 111 with respect to the tube part 112. Then, for example, a tool (not shown) may be inserted into the support part 111 via the outlet 1112a to expand the first portion 1111 of the support part 111 from the inner side of the support part 111, and the expended first portion 1111 may be shown as in FIG. 5. The said tool may, for example, be an expander, but the present disclosure is not limited thereto. By doing so, the first portion 1111 is able to engaged with the tube part 112, such that the support part 111 is fixed with respect to the tube part 112, and the fixity between the tube part 112 and the support part 111 can be firmly secured. Please be noted that the diameter of the expanded first portion 1111 of the support part 111 may be at least partially smaller than that of the second portion 1112, but the present disclosure is not limited thereto. In some other embodiments of the present disclosure, the diameter of the expanded first portion of the support part may be larger than that of the second portion. Please be noted that the configuration of this embodiment, in which the tube part 112 is sleeved on the first portion 1111 of the support part 111 with the smaller diameter, is not intended to restrict the present disclosure.

The male coupler 12 may be rotatably sleeved on the second portion 1112 of the support part 111 of the fluid passage 11 at the outlet 1112a. The male coupler 12 may have a thread part 121 located close to the outlet 1112a. The thread part 121 can be threaded with an end fitting (not shown) such as a sprinkler with female threads for outputting fluid from the fluid passage 11. Please be noted that the configuration of this embodiment, in which the male coupler 12 is rotatably sleeved on the second portion 1112 with the larger diameter of the support part 111, is not intended to restrict the present disclosure.

The blocker 13 may be disposed at a side of the second portion 1112 away from the first portion 1111. Moreover, the blocker 13 may be radially protruded from the second portion 1112 of the support part 111 of the fluid passage 11 at the outlet 1112a to restrict detachment of the male coupler 12 from the outlet 1112a of the fluid passage 11. The blocker 13 may be in a loop shape to form a collar, such that the blocker 13 can block the male coupler 12 with a whole loop. However, the present disclosure is not limited thereto. In some embodiments of the present disclosure, the blocker may be a plurality of tabs that has sufficient mechanical strength and protrudes from the second portion. Further, please be noted that the blocker 13 in this embodiment is made in one piece with the support part 111, but the present disclosure is not limited thereto. In some other embodiments of the present disclosure, the blocker and the support part may be two components able to be assembled together.

The ferrule 14 may be made of metal such as copper, but the present disclosure is not limited thereto. The ferrule 14 may be fixedly disposed on the tube part 112. Specifically, the ferrule 14 may be sleeved on the tube part 112 to restrict the expansion of the tube part 112 from excessive outward movement during the abovementioned expansion of the first portion 1111 of the support part 111. This expansion of the tube part 112 may enable the fixity of the ferrule 14 on the tube part 112, and the ferrule 14 also firmly secures the fixity between the tube part 112 and the support part 111. Moreover, the ferrule 14 may be located at a side of the male coupler 12 away from the blocker 13 to restrict the movement of the male coupler 12 between the blocker 13 and the ferrule 14.

The sleeve 15 may be rotatably sleeved on the fluid passage 11, and the sleeve 15 may be fixed to the male coupler 12. It can be also considered that the sleeve 15 may be rotatably sleeved on the fluid passage 11 through the fixity between the sleeve 15 and the male coupler 12. Therefore, the sleeve 15 can be rotated to rotate the male coupler 12 with respect to the fluid passage 11, which is convenient to screw the male coupler 12 to an end fitting. Moreover, the thread part 121 of the male coupler 12 may be exposed by the sleeve 15 for being conveniently threaded with the end fitting. Please be noted that the sleeve 15 in this embodiment is an assembly with a plurality of components, but the present disclosure is not limited thereto. Further, the sleeve 15 may be made of plastic such as polypropylene (PP) and thermoplastic rubber (TPR), but the present disclosure is not limited thereto.

According to the hose assembly discussed above, since the male coupler and the sleeve can be together rotated with respect to the fluid passage, the blocker and the ferrule that are fixed to one another, the engagement between the male coupler and an end fitting can be easily accomplished simply by rotating the small-sized sleeve, and tangling and twisting of the tube part caused by rotation of the tube part can also be prevented.

Further, with the design of the support part of the fluid passage, the strength at the outlet can be enhanced, such that fluid leakage from the male coupler can be prevented.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A hose assembly (1), comprising:
   a fluid passage (11), having an outlet (1112a);
   a male coupler (12), rotatably sleeved on the fluid passage (11) near the outlet (1112a);
   a blocker (13), protruded from the fluid passage (11) at the outlet (1112a) to restrict detachment of the male coupler (12) from the outlet (1112a) of the fluid passage (11); and
   a sleeve (15), rotatably sleeved over the fluid passage (11), wherein the sleeve (15) is fixed to the male coupler (12) from a side of the male coupler (12) away from the outlet (1112a), the sleeve (15) exposes a thread part (121) of the male coupler (12), and the thread part (121) exposed by the sleeve (15) is rotatable with respect to the fluid passage (11) through fixity between the sleeve (15) and the male coupler (12).

2. The hose assembly (1) according to claim 1, wherein the fluid passage (11) comprises a support part (111) and a tube part (112), the support part (111) comprises a first portion (1111) and a second portion (1112) that are connected to each other, the second portion (1112) has the outlet (1112a) at a side thereof away from the first portion (1111), the tube part (112) is fixedly sleeved on the first portion (1111), the male coupler (12) is rotatably sleeved on the second portion (1112), and the blocker (13) is disposed at the side of the second portion (1112) away from the first portion (1111).

3. The hose assembly (1) according to claim 2, wherein the first portion (1111) of the support part (111) is engaged with the tube part (112) to secure fixity between the tube part (112) and the support part (111).

4. The hose assembly (1) according to claim 2, further comprising a ferrule (14) disposed on the tube part (112) of the fluid passage (11), wherein the ferrule (14) secures fixity between the tube part (112) and the support part (111).

5. The hose assembly (1) according to claim 1, further comprising a ferrule (14) fixedly sleeved on a tube part (112), wherein the ferrule (14) is located at a side of the male coupler (12) away from the blocker (13) to restrict movement of the male coupler (12) between the blocker (13) and the ferrule (14).

6. The hose assembly (1) according to claim 1, wherein the blocker (13) is in a loop shape to form a collar.

* * * * *